United States Patent [19]

Miyoshi

[11] Patent Number: 5,249,657
[45] Date of Patent: Oct. 5, 1993

[54] MOTOR-OPERATED ACTUATOR

[75] Inventor: Sotsuo Miyoshi, Hyogo, Japan

[73] Assignee: Mitsubishi Denki Kabushiki Kaisha, Tokyo, Japan

[21] Appl. No.: 878,424

[22] Filed: May 4, 1992

[30] Foreign Application Priority Data

May 14, 1991 [JP] Japan ............................ 3-107910

[51] Int. Cl.⁵ ............................................. F16D 21/04
[52] U.S. Cl. ......................................... 192/20; 192/35; 267/158; 188/82.84
[58] Field of Search ............... 192/20, 35, 38; 267/158, 164, 260; 188/82.84, 82.2; 403/209, 213

[56] References Cited

U.S. PATENT DOCUMENTS 4,573,723 3/1986 Morita et al. ................... 292/336.3
4,645,050 2/1987 Ingenhoven ...................... 192/36

FOREIGN PATENT DOCUMENTS 58-47551 10/1983 Japan.

Primary Examiner—Leslie A. Braun
Assistant Examiner—Andrea Pitts

[57] ABSTRACT

A motor-operated actuator has a clutch members are set in slide recesses formed in a drive member which are regulated in movement with a clutch base. A protrusion is formed on each of the clutch members, and a groove is formed around the protrusion. Both end portions of a return spring are placed in the grooves of the clutch members, and fixed there by thermal caulking. Thereby, the clutch member is prevented from being damaged by unsatisfactory disengagement. The clutch members are prevented from being disconnected from the return spring, and the former can be positively connected to the latter with high efficiency.

11 Claims, 6 Drawing Sheets

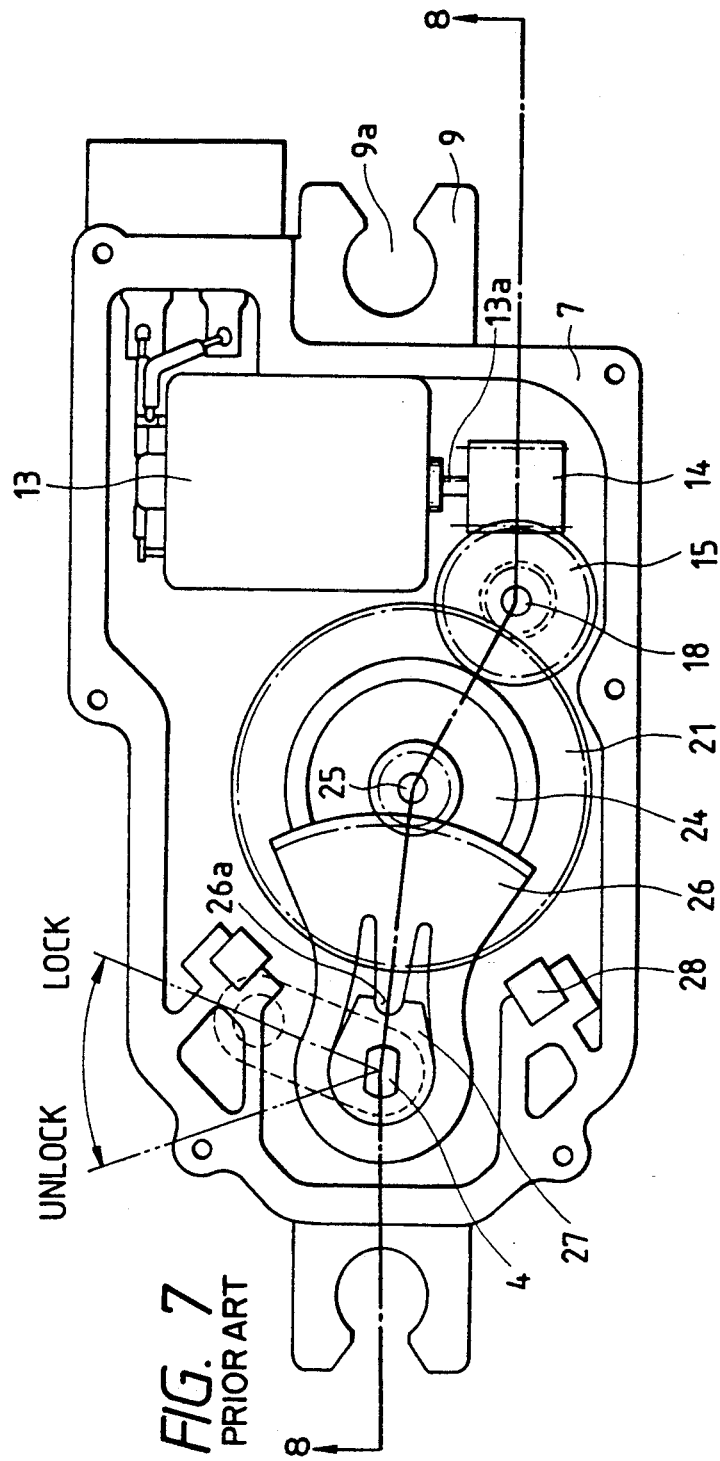
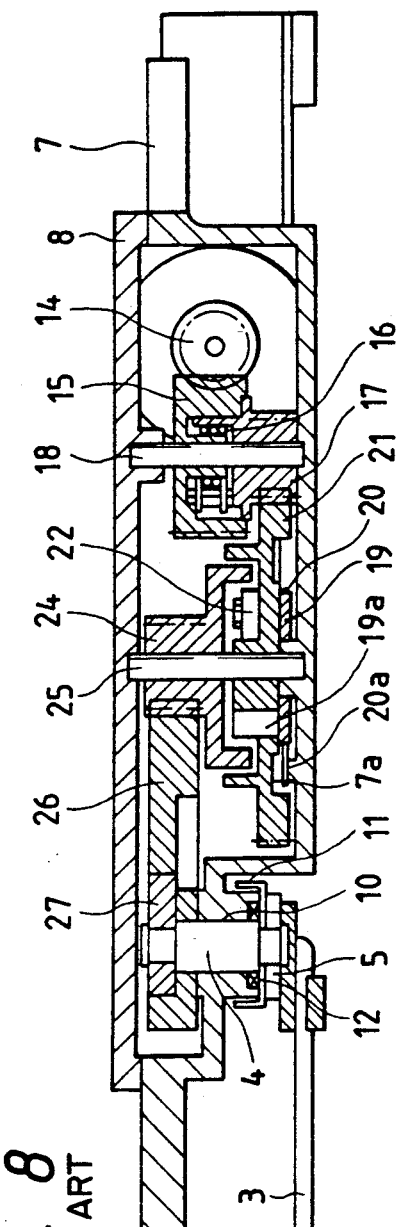
FIG. 7 PRIOR ART
FIG. 8 PRIOR ART

MOTOR-OPERATED ACTUATOR

BACKGROUND OF THE INVENTION

1. Field of the Invention

This invention relates to an actuator with an electric motor as its drive source, namely, a motor-operated actuator which is employed, for instance, for locking a door of an automobile.

2. Description of the Prior Art

A motor-operated actuator of this type has been disclosed by. Examined Japanese Patent Publication Sho-58-47551/(1983) and Unexamined Japanese Patent Publications Sho-60-113856/(1985) and Sho-60-253680/(1985). In order to lock and unlock the door not only by remote operation but also by manual operation, the motor-operated actuator generally includes a clutch mechanism which disengages a door lock mechanism from the motor except when the actuator is actuating to lock or unlock the door by remote operation.

FIG. 6 is a front view showing the installation of the above-described door lock actuator. FIG. 7 is a plan view showing the internal structure of the actuator. FIG. 8 is a sectional view taken along line 8—8 in FIG. 7. FIG. 9 is a diagram showing a link bar in detail. FIG. 10 is an exploded perspective view of a clutch mechanism. As shown in the figures, the door lock actuator 1 is coupled to a clutch mechanism 2 through a rod 3. More specifically, the actuator 1 has an output shaft 4, to which a link bar 5 is fixedly secured. The free end of the link bar 5 is coupled to one end of the rod 3 by a clamp 6, the other end of which is coupled to a pin located at the middle portion of a lever 2a, which has a lock knob 2b at the end. The actuator 1 comprises a housing made up of an actuator body 7 of synthetic resin and a cover 8 coupled to the actuator body 7 with screw. The actuator body 7 has mounting pieces 9 at both ends. Each of the mounting pieces has a through-hole 9a with a cut With the mounting pieces 9, the actuator 9 is secured inside the door with screws. The output shaft 4 coupled to the above-described door lock mechanism 2 is engaged through a seal 12 with a hole 10 formed in the actuator body 7, in such a manner that it protrudes outside the actuator body 7.

An electric motor 13 is arranged in the actuator body 7. The motor 13 has an output shaft 13a, on which a small gear 14 is mounted as a speed reduction mechanism. The small gear 14 is engaged with a gear 15, which is coupled to a pinion gear 17 through a spring 16 which is elastic in the direction of rotation. The pinion gear 17 is engaged with external teeth 21d of a clutch input gear 21. The clutch input gear 21, as shown in FIGS. 11A to 11C, has roller guide walls 21a and 21a like the slopes of a sector, and an arcuate lever hole 21b. The roller guide walls 21a and 21a, as shown in FIG. 11A, are engaged with rollers 22 and 22 coupled to both ends of a return spring 23. Reference numeral 19 designates a lever drum on which a brake spring 20 is elastically mounted. The brake spring 20 has both end portions 20a which are abutted against a stopper 7a of the actuator body 7, so that it is fixedly positioned. A lever 19a is protruded from one side of the lever drum 19, and is inserted into the lever hole 21b of the clutch input gear 21. Reference numeral 24 designates a clutch output gear. The clutch output gear 24 has transmission protrusions 24a, which are engaged with an inner wall 21c of the clutch input gear 21 so that the latter 21 is combined with the clutch output gear 24. The clutch input gear 21, the lever drum 19, and the clutch output gear 24 are rotatably mounted on one and the same clutch shaft 25. The clutch output gear 24 has a gear 24d, which is engaged with an output gear 26. The output gear 26 has a protrusion 26a, which is elastically engaged with a plate 27 which is fixedly secured to the above-described output shaft 4 by caulking.

Now, the operation of the actuator thus constructed will be described. When the lock mechanism 2 is in unlock state with the lock knob 2b pulled up, the link bar 5 of the door look actuator 1 is on the UNLOCK side. When, under this condition, the operator sets a predetermined switch (not shown) to "LOCK", a hold circuit (not shown) is activated so that the motor 13 is rotated for a predetermined period of time (for instance 0.5 second), so that the rotation of the motor is transmitted through the small gear 14 and the reduction gear 15 to the pinion gear 17 to rotate the latter 17 while rotating and compressing the spring 16.

The rotation of the pinion gear 17 is transmitted to the clutch input gear 21 so that the clutch is connected. This will be described in more detail. As shown in FIG. 11A, the clutch input gear 21 is turned clockwise relative to the lever 19a. In this operation, the movement of the roller 22 is prevented by the lever 19a, while the return spring 23 is stretched. As a result, the roller 22 is moved radially outwardly along the roller guide wall 21a until it abuts against the clutch input gear's inner wall 21c (FIG. 11B). In this operation, the brake spring 20 allows to slide on the lever drum 19, and therefore the lever 19a is turned at the same speed as the clutch input 21.

As the clutch input gear 21 is turned, the roller 22 moved radially outwardly is engaged with the transmission protrusion 24a of the clutch output gear 24, to turn the latter 24. As the clutch output gear 24 is turned in this manner, the output shaft 4 is turned through the output gear 26 and the plate 27, so that the lever 2a is pulled down through the link bar 5 and the rod 3. As a result, the look mechanism 2 is operated as indicated by the phantom line; that is, it is placed in a lock state. When a predetermined period of time elapsed, the supply of current is suspended by a timer, so that the repulsive force of the spring 16 causes the motor 13 to turn in the reverse direction. As a result of the reverse turn of the motor, the clutch input gear 21 and the clutch output gear 24 are loosened from each other as indicated by the dotted line in FIG. 11C. Therefore, the roller 22 is returned to the initial position (FIG. 11A) by the elastic force of the return spring 23, so that the clutch is disconnected. The above description can be equally applied to an operation that the locked door is automatically unlocked, and an operation that the unlocked door is manually locked.

The conventional motor-operated actuator is constructed as described above. Therefore, as the return spring 23 is deteriorated, or the gears are increased in the resistance of rotation because of low temperature, the rotation of the motor in the reverse direction upon completion of the operation of the actuator is decreased, with the result that the roller 22 may not be returned to the initial position in the clutch. If, under this condition, the next operation (in the opposite direction) is carried out, then the roller 22 may be moved from its predetermined operating position being pushed by the transmission protrusion 24a of the clutch output gear 24. As a result, the roller 22 may be disconnected from the return spring 23; that is, the clutch mechanism may be broken. In addition, it is rather troublesome to connect the rollers 22 to the returned spring 23.

SUMMARY OF THE INVENTION

Accordingly, an object of this invention is to eliminate the above-described difficulties accompanying a conventional motor-operated actuator. More specifically, an object of the invention is to provide a motor-operated actuator in which the clutch mechanism operates smoothly being prevented from damage, and the rollers can be connected to the return spring with high efficiency.

The foregoing object of the invention has been achieved by the provision of: A motor-operated actuator in which a clutch mechanism provided between a drive member operating in association with a motor shaft of an electric motor and a driven member operating in association with an output shaft transmits the torque of the drive member to the driven member, the transmission of the torque being suspended when the electric motor is stopped, the clutch mechanism is movable radially and circumferentially as the motor rotates, and has a pair of clutch members coupled to each other through a return spring, and the clutch members are energized by a lever adapted to transmit a predetermined amount of torque to a body, and interposed between the drive member and the driven member, and, when the motor is stopped, are placed at initial positions to release the transmission of torque; in which, according to the invention, the clutch members are set in slide recesses formed in the drive member and are held with a clutch holding plate.

Furthermore, a motor-operated actuator in which a clutch mechanism provided between a drive member operating in association with a motor shaft of an electric motor and a driven member operating in association with an output shaft transmits the torque of the drive member to the driven member, the transmission of the torque being suspended when the electric motor is stopped, the clutch mechanism is movable radially and circumferentially as the motor rotates, and has a pair of clutch members coupled to each other through a return spring, and the clutch members are energized by a lever adapted to transmit a predetermined amount of torque to a body, and interposed between the drive member and the driven member, and, when the motor is stopped, are placed at initial positions to release the transmission of torque; in which, according to the invention, each of the clutch members has a protrusion at the center, and a groove around the protrusion, and both end portions of the return spring are wound on the protrusions so as to be set in the grooves, and then secured to the clutch members by deforming the protrusion by caulking.

According to the motor-operated actuator of the present invention, when the next operation (in the opposite direction) is carried out before the clutch members are placed at their initial positions, the clutch member pushed by the transmission protrusion of the driven member is restricted in the direction of movement by the clutch base, so that the clutch mechanism is prevented from being damaged by its unsatisfactory disengagement.

Furthermore, in the motor-operated actuator, the clutch members are securely connected to the return spring by caulking, and therefore the clutch members will not be disconnected from the return spring when pushed by the transmission protrusions of the driven member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 7 is a diagram showing an internal structure of the conventional motor-operated actuator.

FIG. 8 is a sectional view taken along line 8—8 in FIG. 7.

DETAILED DESCRIPTION OF THE PREFERRED EMBODIMENT

A motor-operated actuator, one embodiment of this invention, will be described with reference to the accompanying drawings.

Figure 1:
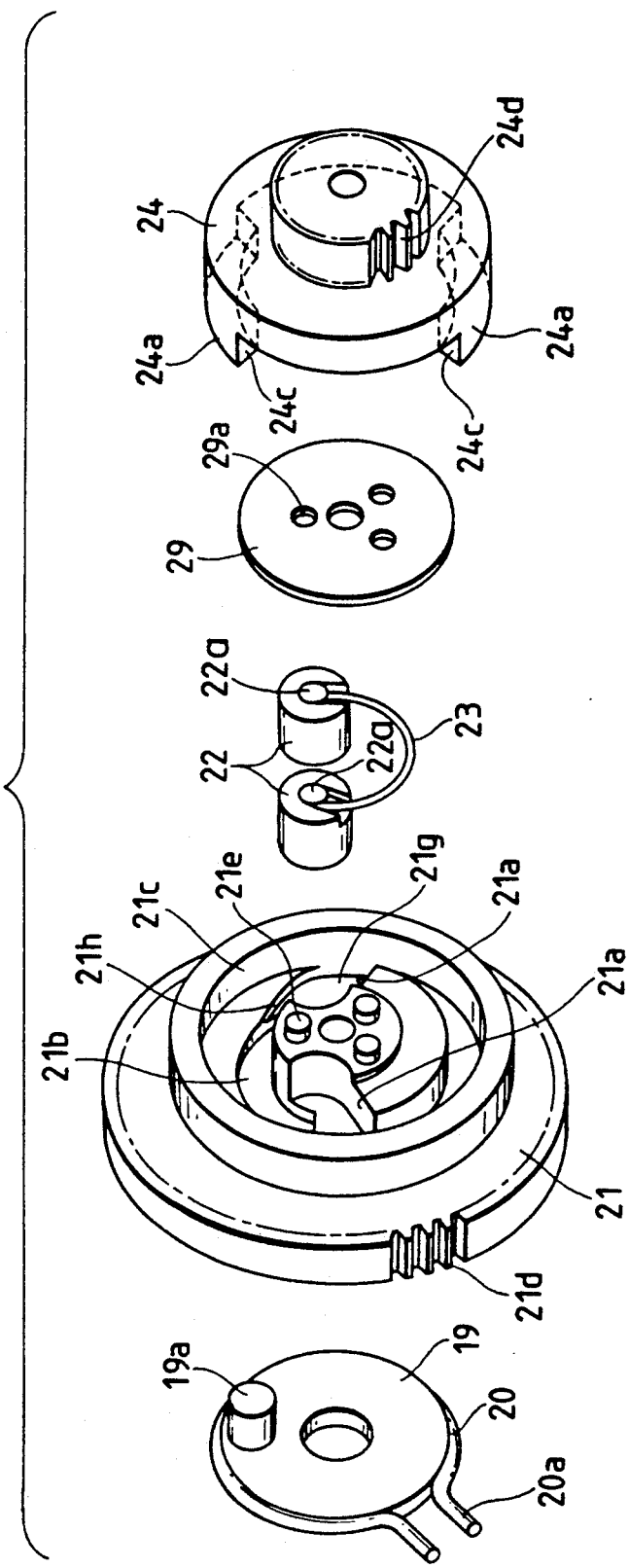
FIG. 1 is an exploded perspective view showing a clutch mechanism in a motor-operated actuator which constitutes one embodiment of the invention.

FIG. 1 is an exploded perspective view showing a clutch mechanism in the motor-operated actuator according to the invention. In the clutch mechanism, a lever drum 19 and a driven member, namely, a clutch output gear 24 are the same as those in the above-described conventional clutch mechanism; however, a structure for holding clutch members, namely, rollers 22 in a drive member, namely, a clutch input gear 21, and a structure for coupling the rollers 22 to a return spring 23 are different from those in the conventional one. In FIG. 1, parts corresponding functionally to those which have been described with reference to the conventional motor-operated actuator are therefore designated by the same reference numerals or characters. The clutch input gear 21 has slide recesses 21g for receiving end portions of the rollers 22 on one side, and slide walls 21h spaced slightly larger than the outside diameter of the rollers 22 from the roller guide walls 21a.

Figure 2:
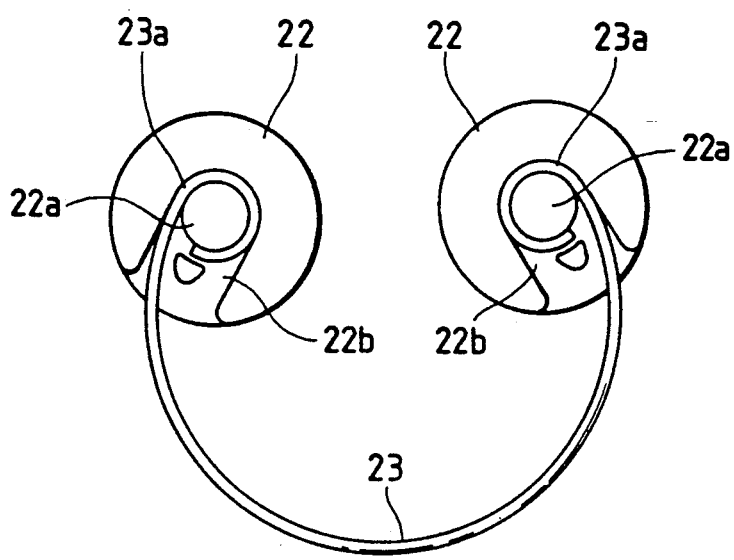
FIG. 2 is a front view showing clutch members and a return spring which are going to be connected by caulking.
Figure 3:
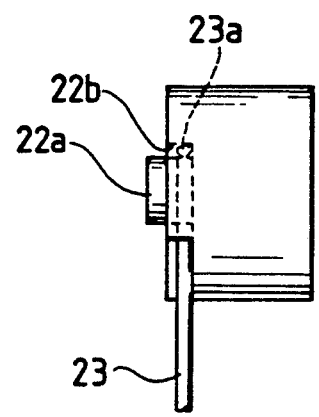
FIG. 3 is a side view of the clutch member and the return spring shown in FIG. 2.
Figure 4:
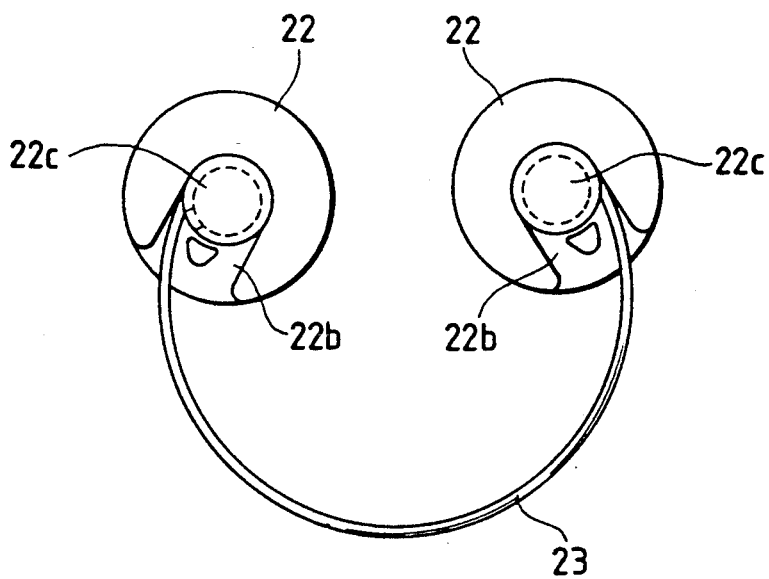
FIG. 4 is a front view of the clutch members and the return spring which have been connected by caulking.
Figure 5:
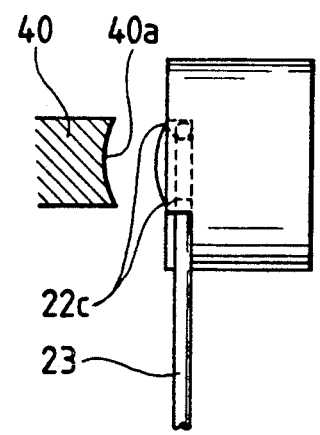
FIG. 5 is a side view of the clutch member and the return spring in FIG. 4.
Figure 6:
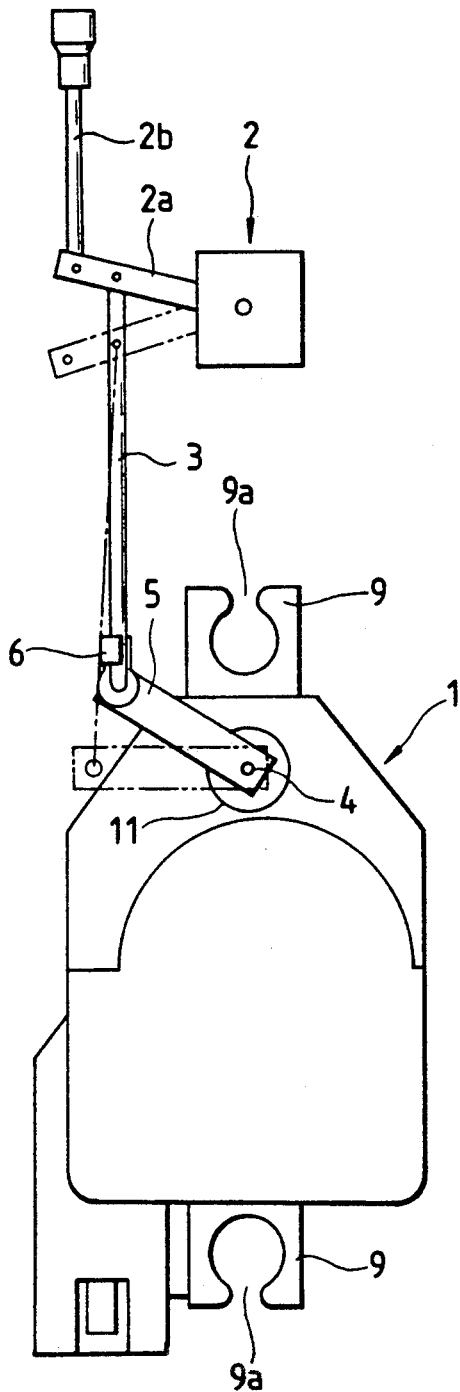
FIG. 6 is a front view showing a conventional motor-operated actuator which is applied to a door lock device in an automobile.
Figure 9:
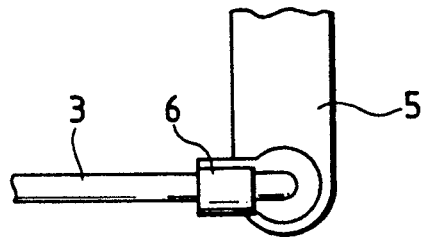
FIG. 9 is a diagram showing a link bar in detail.
Figure 10:
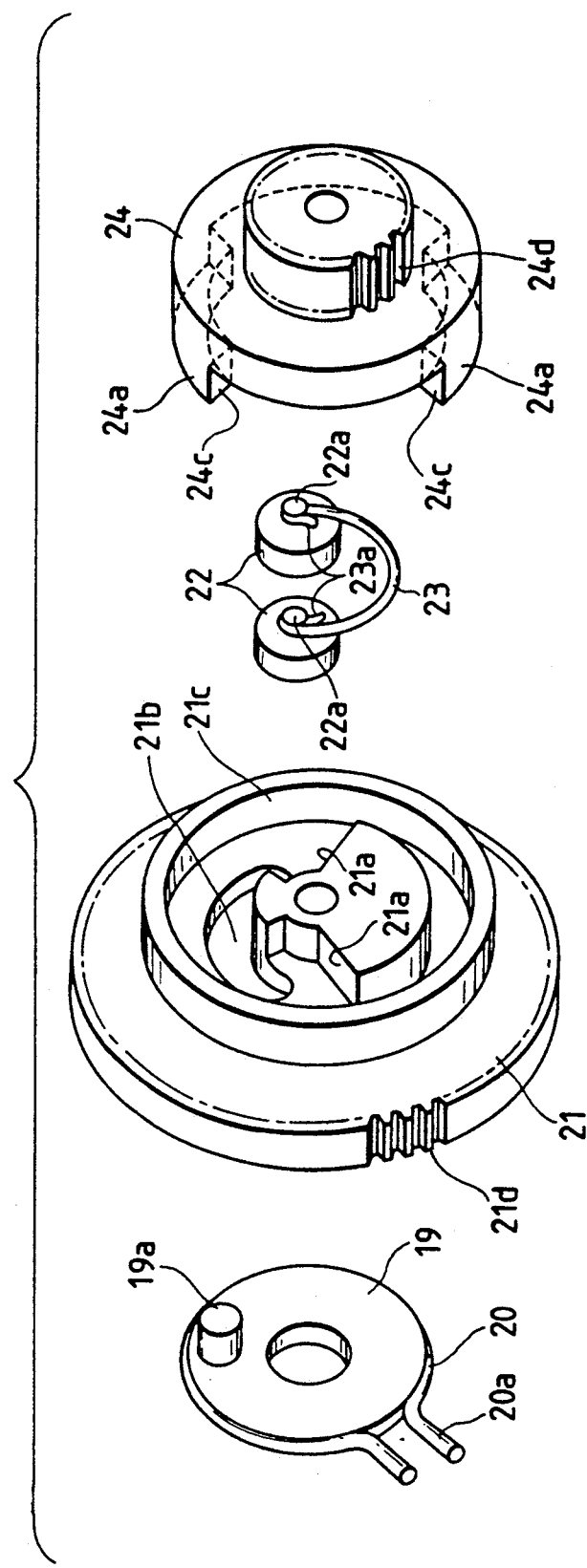
FIG. 10 is an exploded perspective view of a clutch mechanism in the conventional motor-operated actuator.
Figure 11A:
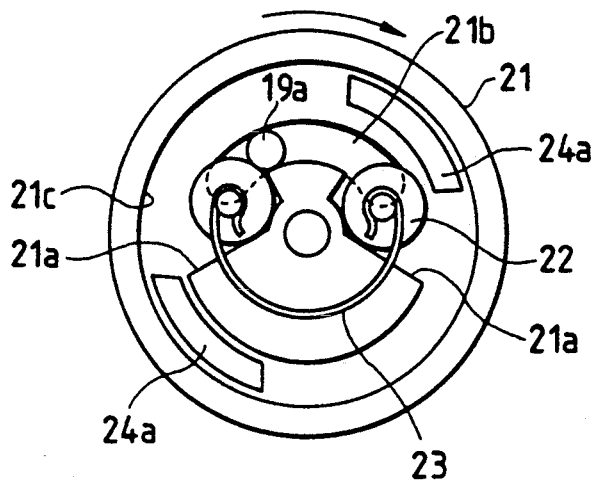
FIG. 11 is a diagram for a description of the operation of the conventional clutch step by step.
Figure 11B:
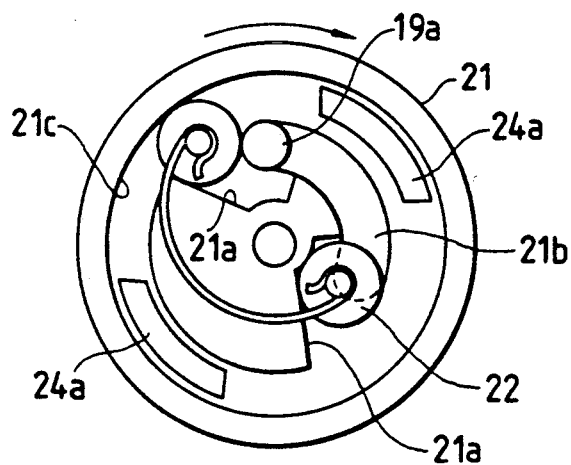
Figure 11C:
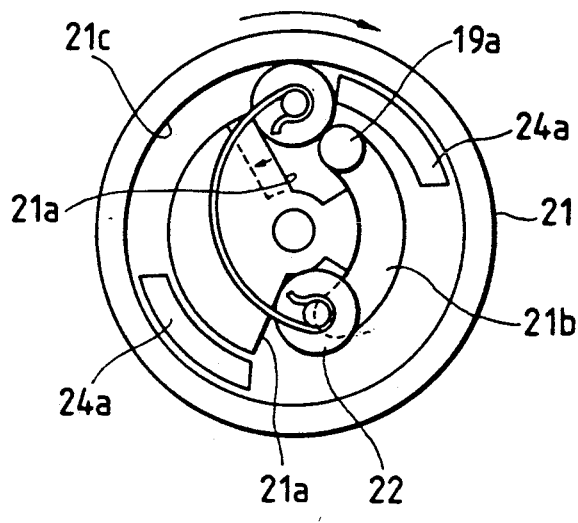

FIGS. 2 through 5 are diagrams for a description of the connection of the rollers 22 to the return spring. As shown in FIGS. 2 and 3, a protrusion 22a is formed on each of the rollers 22 at the center, and a groove 22b is formed around the protrusion 22a. Both end portions 23a of the return spring 23 are put in the grooves 22b by winding them on the protrusions 22a, respectively. Thereafter, the protrusions 22a are deformed; that is, they are molten with the inwardly curved end face 40a of a caulking jig 40 heated as indicated at 22c in FIGS. 4 and 5, so that the end portions 23a of the return spring 23 are fixedly secured to the rollers 22, respectively. The rollers 22 thus connected to the return spring are set in the slide recesses 21g of the clutch input gear 21, and are supported by a plate 29 having holes 29a which is placed over the rollers 22. In this case, pins 21e formed on the clutch input gear 21 are engaged with the holes 29a of the plate 29, and secured to the latter by caulking.

In the case where, at the time of suspension of the supply of current to the motor after the operation of the clutch mechanism, the torque for causing the motor to turn in the reverse direction is not great enough for instance because the return spring is deteriorated or the gears are increased in the resistance in rotation because of low temperature so that it is temporarily impossible to return the roller 22 to its initial position, the following operation of the actuator causes the transmission protrusion 24a of the clutch output gear 24 to push the roller 22 in the direction opposite to the direction in which the roller was moved in the engagement of the clutch mechanism, so that the roller 22 is returned along the slide wall 21h to its initial position.

As was described above, the rollers 22 are fixedly secured to the return spring 23 by caulking. Hence, even when the transmission protrusions 24a strike on the rollers 22, the latter 22 will never be disconnected from the return spring 23; that is, the clutch mechanism is prevented from damage. The rollers 22 are connected to the return spring 23 by thermally deforming the protrusions 22c of the rollers; that is, the connection of the rollers to the return spring can be achieved with ease, requiring no delicate machining operation. The plate 29 prevents the rollers 22 from being moved outwardly, and maintains the positions of the latter 22 unchanged with respect to the slide walls 21h.

While the invention has been described with reference to the automobile door lock actuator, the technical concept of the invention is widely applicable to other motor-operated actuators.

As was described above, in the motor-operated actuator of the invention, the clutch members are set in the slide recesses formed in the drive member, and are held with the clutch base so that it is allowed to move linearly. This prevents the clutch mechanism from being damaged by its unsatisfactory disengagement.

The clutch members are connected to the return spring by caulking. This eliminates the difficulty that the clutch members are disconnected from the return spring when the disengagement of the clutch mechanism is unsatisfactory. Furthermore, for the same reason, the clutch members can be connected to the return spring with high efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor-operated actuator comprising:
   a clutch mechanism, provided between a drive member operating in association with a motor shaft of a motor and a driven member operating in association with an output shaft, for transmitting a driving torque of said drive member to said driven member, the transmission of said torque being suspended when said motor is stopped.
   said clutch mechanism including a pair of clutch rollers coupled to each other through a return spring;
   said drive member including a clutch input gear having roller guide walls in a form of sector for receiving one of said clutch rollers;
   said driven member including a clutch output gear having transmission protrusion to be engaged with said clutch input gear by said clutch mechanism;
   said clutch input gear and said clutch output gear being rotatably mounted about a common shaft;
   wherein said clutch rollers are set in slide recesses formed inside said clutch input gear, and are held by a clutch holding plate.

2. The motor-operated actuator as claimed in claim 1, wherein each of said clutch rollers has a protrusion at the center, and a groove around said protrusion, both end portions of said return spring are wound on sad protrusions so as to be set in said grooves.

3. The motor-operated actuator as claimed in claim 1, further comprising a lever drum from which a lever extends, the clutch input gear has an arcuate lever hole for receiving the lever of the lever drum.

4. The motor-operated actuator as claimed in claim 3, further comprising a brake spring extending around the lever drum, the brake spring has end portions which abut a stopper fixed on an actuator body, the actuator body encloses the motor and clutch mechanism.

5. The motor-operated actuator as claimed in claim 1, wherein the motor is an electric motor.

6. The motor-operated actuator as claimed in claim 1, wherein the end portion of the return spring are connected to the protrusions by caulking.

7. The motor-operated actuator as claimed in claim 1, wherein the clutch input gear has a plurality of pins and the clutch holding plate has a corresponding number of holes defined therein, the pins being received in the holes when the clutch holding plate is mounted on the input gear.

8. The motor-operated actuator as claimed in claim 7, wherein three pins and three holes are provided respectively on the clutch input gear and the clutch holding plate.

9. The motor-operated actuator as claimed in claim 1, wherein the return spring generally has a U-shape.

10. The motor-operated actuator as claimed in claim 9, a first one of the end portions of the return spring is wound around the protrusions in a clockwise direction and a second one of the end portions is wound around another protrusion in a corner clockwise direction.

11. A motor-operated actuator comprising:
   a clutch mechanism, provided between a drive member operating in association with a motor shaft of a motor and a driven member operating in association with an output shaft, for transmitting a driving torque of said drive member to said driven member, the transmission of said torque being suspended when said motor is stopped;
   said clutch mechanism including a pair of clutch rollers coupled to each other through a return spring;

said drive member including a clutch input gear having roller guide walls in a form of sector for receiving one of said clutch rollers;

said driven member including a clutch output gear having transmission protrusion to be engaged with said clutch input gear by said clutch mechanism;

said clutch input gear and said clutch output gear being rotatably mounted about a common shaft;

each of said clutch rollers has a protrusion at the center and a groove around the protrusion, both end portions of the return spring being wound on said protrusion so as to be set in the grooves.

* * * * *